United States Patent [19]

Smith

[11] 4,193,058
[45] Mar. 11, 1980

[54] SYSTEM FOR DISPLAYING SEISMIC DATA ON A CATHODE-RAY TUBE

[75] Inventor: Clarence G. Smith, Irving, Tex.

[73] Assignee: Mobil Oil Corporation, New York, N.Y.

[21] Appl. No.: 872,271

[22] Filed: Jan. 25, 1978

Related U.S. Application Data

[63] Continuation-in-part of Ser. No. 854,564, Nov. 25, 1977.

[51] Int. Cl.² ............................ G01V 1/34; G01D 1/00
[52] U.S. Cl. .................................... 367/71; 346/33 C; 315/389; 315/367
[58] Field of Search .............. 340/15.5 DS; 346/33 C; 315/387, 389, 367

[56] References Cited
U.S. PATENT DOCUMENTS

| | | | |
|---|---|---|---|
| 3,609,219 | 9/1971 | Diehl | 315/387 |
| 3,704,450 | 11/1972 | Smith | 340/172.5 |
| 3,714,663 | 1/1973 | Smith | 340/15.5 TG |
| 3,796,912 | 3/1974 | Funston | 315/387 |
| 3,886,526 | 5/1975 | Smith | 340/15.5 DS |
| 3,889,155 | 6/1975 | Klingman | 315/387 |
| 3,916,370 | 10/1975 | Neeley | 340/15.5 DS |
| 3,947,755 | 3/1976 | Daute | 315/387 |

Primary Examiner—Nelson Moskowitz
Attorney, Agent, or Firm—C. A. Huggett; William J. Scherback

[57] ABSTRACT

Multiplexed seismic data representing a plurality of seismic channels intensity modulates each sweep of the electron beam of a cathode-ray tube. Each successive sweep of the electron beam is photographically reproduced on a rotating drum plotter to provide a seismic record section. The sweep signal for controlling the electron beam is automatically gain controlled so that the number of seismic traces per inch remains constant.

7 Claims, 6 Drawing Figures

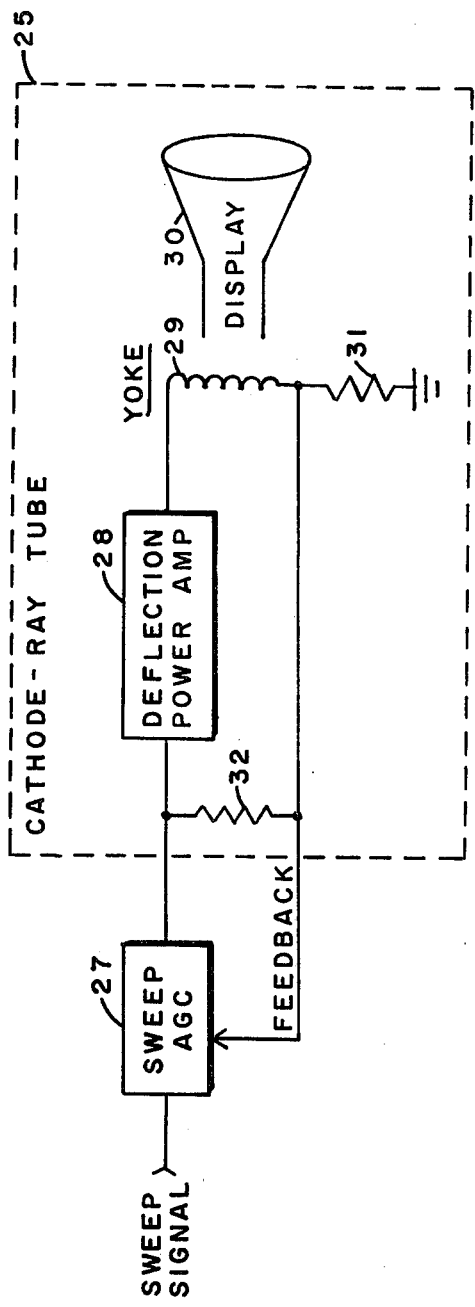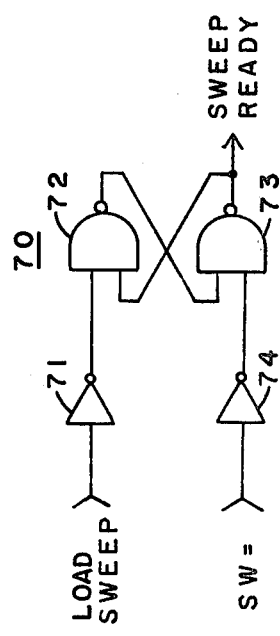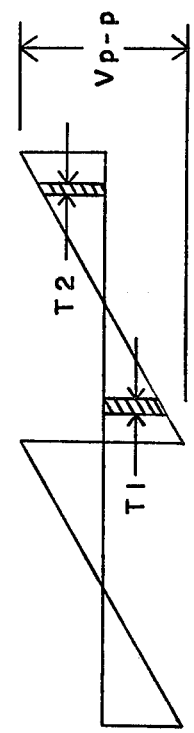

SYSTEM FOR DISPLAYING SEISMIC DATA ON A CATHODE-RAY TUBE

CROSS REFERENCES TO RELATED APPLICATIONS

This application is a continuation-in-part of U.S. patent application Ser. No. 854,564, filed Nov. 25, 1977.

BACKGROUND OF THE INVENTION

Seismic data representing a plurality of seismic channels is conventionally digitized and stored on magnetic tape for further data processing. In one such data processing operation, the information stored on the magnetic tape is used to modulate a cathode-ray tube so as to display the information on the face of the cathode-ray tube. Such display can then be photographically reproduced by means of a conventional drum plotter. The photographic reproduction obtained is a series of traces, one such trace for each seismic channel, recorded in a parallel relationship. In such data processing operations, the digitized seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefrom in a series of seismic trace recordings on the photographic material surrounding the drum plotter.

Timing lines are produced on the photographic material at fixed intervals along the length of the seismic trace recordins. Timing numbers can be photographically produced on the seismic trace to identify the timing lines in accordance with the teaching of U.S. Pat. No. 3,714,663 to Clarence G. Smith. Selected seismic traces can be marked with lines through the center of the traces for the entire length so that they are readily distinguishable from other seismic traces in accordance with the teaching of U.S. Pat. No. 3,704,450 to Clarence G. Smith. Seismic traces may be annotated with alphanumeric characters to identify such things as section type, area, shotpoint, etc., in accordance with the teaching of U.S. Pat. No. 3,886,526 to Clarence G. Smith.

SUMMARY OF THE INVENTION

The present invention is directed toward a data processing system for displaying seismic data on the face of a cathode-ray tube. A multiplexer successively applies seismic data for each of the plurality of seismic channels to the cathode-ray tube to intensity modulate the electron beam one time during each sweep of the electron beam across the face of the cathode-ray tube for each of the seismic channels. A sweep signal is applied to the yoke of the cathode-ray tube to drive the electron beam across the face of the cathode-ray tube. A measurement is made that is representative of the drive current through the yoke at two spaced-apart times between which seismic data is to be displayed on the face of the cathode-ray tube. This measurement is digitized and compared with a digital reference number identifying the drive current amplifier required through the yoke for display of a predetermined number of seismic traces per inch. The sweep signal applied to the yoke is automatically adjusted until the digitized drive current measurement and the digital reference number are the same.

More particularly, the sweep signal is applied to a voltage divider including a fixed resistance and a photoresistance. That portion of the sweep signal across the photoresistance is applied through a deflection power amplifier to the yoke of the cathode-ray tube. The drive current through the yoke is measured through a series resistor and then digitized. This digitized measurement is compared with the digital reference number identifying the amplitude of the drive current required through the yoke for the display of a predetermined number of seismic traces per inch. A latch is set to a first condition when the digitized drive current measurement is less than the digital reference number and is set to a second condition when the digitized drive current measurement is greater than the digital reference number. This latch sets an integrator to provide a positive slope ramp when the latch is in the first condition and to provide a negative slope ramp when the latch is in the second condition. The integrator drives a lamp illuminating the photoresistor. A negative slope ramp from the integrator decreases lamp brightness and proportionate increase occurs in the resistance of the photoresistor. A positive slope ramp from the integrator increases lamp brightness and a proportionate decrease occurs in the resistance of the photoresistor. As the resistance of the photoresistor changes, the sweep signal to the yoke is continually adjusted until the desired amplitude of the drive current is achieved through the yoke for the display of the predetermined number of seismic traces per inch.

BRIEF DESCRIPTION OF THE DRAWINGS

FIGS. 1 and 3 are block diagram schematics of one embodiment of the present invention.

FIGS. 4 and 5 are circuit schematics of the various units illustrated in sweep AGC of FIGS. 1 and 3.

FIG. 6 is a waveform representing the horizontal ramp signal to the cathode-ray tube of FIGS. 1 and 3.

DESCRIPTION OF THE PREFERRED EMBODIMENT

Figure 1:
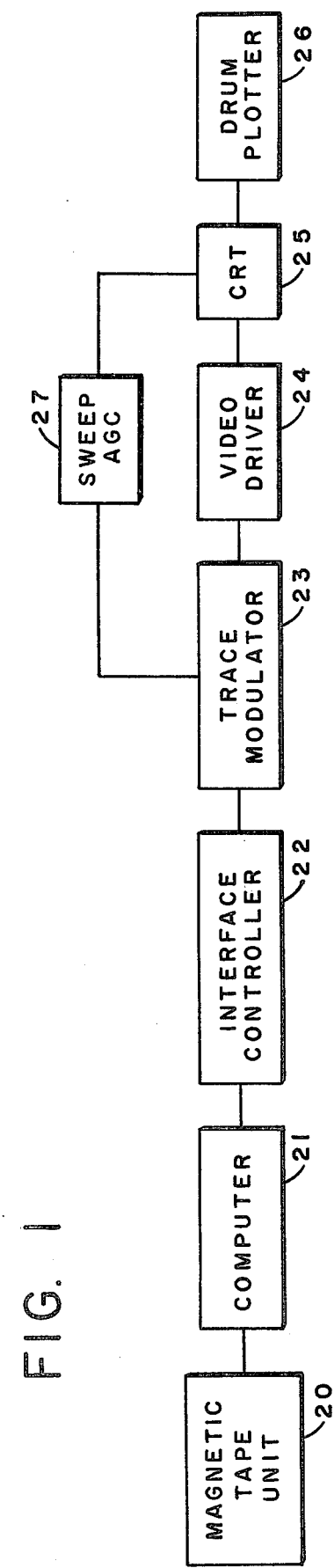
Figure 2:
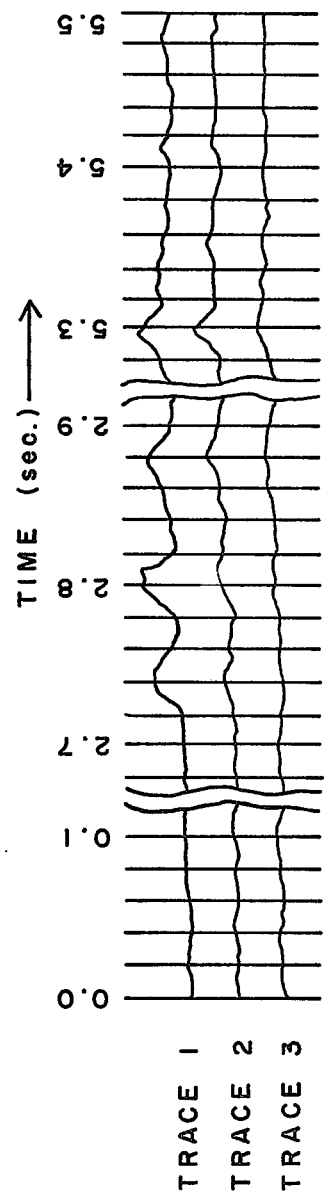
FIG. 2 illustrates 24 seismic traces which have been recorded by the embodiment of the present invention.

A seismic trace display and photographic recording system is illustrated in FIG. 1. Such a system includes a magnetic tape unit 20 and a computer 21 for supplying seismic trace digital signals to an interface controller 22. The interface controller 22 converts the seismic trace digital signals to analog signals and applies these signals to the trace modulator 23. The trace modulator 23 accepts and converts 24 channels of seismic analog signals to multiplexed seismic data. The multiplexed data is then applied by way of video driver 24, which operates as an OR gate, to the cathode-ray tube 25 for intensity modulation of the electron beam. In accordance with the present invention, the horizontal ramp signal for controlling the sweep of the electron beam across the face of the cathode-ray tube is provided by the sweep automatic gain control (AGC) 27 in response to a clock signal from the trace modulator 23. The multiplexed data successively intensity modulates the electron beam one time during each such sweep of the electron beam across the face of the cathode-ray tube for each of the 24 seismic channels. The display on the face of the cathode-ray tube is focused onto a plotter 26. Plotter 26 comprises a rotatable drum around which is placed a photosensitive film or paper on which is recorded the display presented on the face of the cathode-ray tube 25. Each successive sweep of the electron beam on the face of the cathode-ray tube is photographically reproduced on plotter 26 in a side-by-side relationship to produce a seismic trace display as illustrated in FIG. 2.

A magnetic tape unit 20 suitable for use with the foregoing-described system is the T.I. 951, a digital transport manufactured by Texas instruments Incorporated, Dallas, Texas. The T.I. 951 stores magnetic tape input digital data in the memory of a computer 21. One such computer which is suitable for use with the present invention is the T.I. 980A, also manufactured by Texas Instruments Incorporated. The computer 21 sorts and transfers digital data to a buffer memory. The buffer memory transfers words under clock control to a digit register for conversion to analog signals. The analog signals are applied through the interface controller 22 to the trace modulator 23 for transfer to cathode-ray tube 25. The memory buffer controls the next data rate from the magnetic tape to prevent the overflow or emptying of the memory until the transfer of analog signals to the trace modulator 23 is complete. This ensures that the subsequent display of the analog signals on the cathode-ray tube 25 will be at a continuous and uniform data rate. Interface controller 22 provides for timing and control signals in response to command signals from the computer 21. Such timing and control signals direct the rotational speed of the drum plotter and the rate at which the seismic data is photographically recorded on such plotter. For a more complete understanding of the operation of the interface controller, reference may be made to U.S. Pat. No. 3,916,370 to Walter P. Neeley. For a more complete understanding of the trace modulator 23, reference may be made to copending U.S. patent application Ser. No. 854,564 filed Nov. 25, 1977, for Clarence G. Smith, the disclosure of which is incorporated herein by reference.

A plotter 26 suitable for use with the system described herein is the PL-600 Series Cross-Section Plotter manufactured by Dresser SIE, Inc., Houston, Texas. The PL-600 Cross-Section Plotter produces a 5.5-second photographic record at the rate of 7.5 inches per second. The cathode-ray tube 25 exposes only a small portion of the total plotter width in a given 24-seismic-trace plot. In order to plot additional 24-seismic-trace recordings adjacent to previous recordings, the camera is mounted on a movable assembly which may be automatically stepped laterally to the next 24-seismic-trace recording position.

With the foregoing understanding of the seismic trace display and photographic recording system as illustrated in FIG. 1, there will now be described a specific embodiment of the sweep AGC 27 of the present invention in supplying to the cathode-ray tube the sweep signal for controlling the sweep of the electron beam across the face of the cathode-ray tube.

SWEEP AGC (FIG. 3)

In the preferred embodiment, the sweep AGC provides the sweep signal to the deflection power amplifier 28 of the cathode-ray tube 25. Such amplifier provides the drive current to yoke 29 which produces the magnetic field required to deflect or sweep the electron beam across the face of the display 30. The peak-to-peak amplitude of the drive current through the yoke 29 controls the rate of sweep of the electron beam. It is highly desirable in producing seismic record sections that this rate of sweep be precisely controlled during each recording operation so that the number of seismic traces recorded per inch remains constant. Any drift in the drive current supplied to the yoke as might be caused by any number of factors, such as temperature changes, for example, will cause the sweep to vary, thereby changing the trace recording rate. It is therefore a specific feature of the present invention to provide the means for maintaining a relatively constant amplitude drive current to the yoke 29.

In this aspect, a grounding resistance 31 of very low resistance, 1.5 ohms, 1%, high wattage, for example, is connected in series with the yoke 29. In this manner the voltage across the resistor 31 is proportional to the amplitude of the drive current through the yoke 29. This voltage is fed back to the sweep AGC 27 and utilized by the sweep AGC in controlling the sweep signal to the deflection power amplifier 28 so that the amplitude of drive current to the yoke 29 remains relatively constant. A detailed description of the operation of sweep AGC 27 will now be made in conjunction with FIG. 4.

A 4.096-KHZ sweep signal is applied to resistor 40 and photoresistor 41b. The brightness of the lamp 41a illuminating the photoresistor 41b is controlled in response to the feedback signal from resistor 31 of the cathode-ray tube unit. Should the amplitude of the drive current through the yoke 29 start to increase so as to effect an increase in the sweep of the electron beam, the feedback signal to the sweep AGC 27 causes the lamp 41a to get brighter, thereby decreasing the resistance of photoresistor 41b. Conversely, should the amplitude of the drive current through the yoke 29 start to decrease so as to effect a decrease in the sweep of the electron beam, the feedback signal to the sweep AGC 27 causes the lamp 41a to get dimmer, thereby increasing the resistance of the photoresistor 41b. Preferably, such resistance will go as high as one megohm and as low as 100 ohms. Such changes in the resistance of photoresistor 41b vary the sweep signal to the deflection power amplifier 28 which in turn changes the amplitude of the drive current through yoke 29 so as to effect a relatively constant sweep of the electron beam.

The foregoing operation of varying the sweep signal is carried out by means of the sample and hold unit 42, the A/D converter 43, the digital comparator 44, and the lamp driver 45 in response to the feedback signal from the cathode-ray tube unit. Sample and hold 42 receives the feedback control signal and applies it through the voltage follower 50 to two sampling switches 51 and 52. These switches are closed during sample times T1 and T2, respectively, on the horizontal ramp as illustrated in FIG. 6. It is between these two times that seismic data is to be recorded on the face of the cathode-ray tube display. During time T1, switch 51 closes to allow capacitor 53 to charge negative. During time T2, switch 52 closes to allow capacitor 54 to charge positive. Consequently, at the end of sample time T2, the total peak-to-peak voltage, $V_{p-p}$, of the ramp signal is across these two capacitors. The two high-impedance followers 55 and 56 hold this voltage to prevent discharge of the capacitors. These followers 55 and 56 apply the voltage $V_{p-p}$ to the negative and positive inputs, respectively, of a differential amplifier 57. Since the two signals from followers 55 and 56 are of opposite signs, the two signals are summed by the amplifier 57 to provide a positive valued signal to the A/D converter 43.

At the next ramp reset, the one-shot multivibrator 58 provides a start convert pulse to the A/D converter 43 to start the analog-to-digital (14 bit) conversion of the signal from the summing amplifier 57 of the sample and hold unit 42. The converter 43 applies its 14-bit output to the holding register 59. At the end of bit 14 conversion, the output of the A/D converter goes low and causes gate 60 to latch the 14-bit inputs onto the holding register output lines as bits $2^0$ through $2^{13}$. These bits $2^0-2^{13}$ are a binary representation of the peak-to-peak amplitude of the drive current through the yoke 29. They are applied to the digital comparator 44 where they are compared with a 14-bit reference number from the computer 21, representative of the value of the peak-to-peak amplitude of the drive current through the yoke 29 necessary to provide a desired number of seismic traces per inch on the face of the cathode-ray-tube display. The comparator 44 provides an output on one of the three lines. Line 61 is activated when the bits $2^0-2^{13}$ represent a value greater than the value represented by the 14-bit reference from the computer. Line 62 is activated when the bits $2^0-2^{13}$ represent a value less than the value represented by the 14-bit reference from the computer. Line 63 is activated when these two 14-bit values are the same.

Should line 61 be activated, the peak-to-peak amplitude of the drive current through the yoke 29 should be decreased. The latch comprising gates 64 and 65 provides a low output to the negative input of a high-gain operational amplifier operating as a long-time constant integrator 67.

When this negative input is low, it is more negative than the positive input and the integrator provides a positive slope ramp through the lamp driver 68 and resistor 69 to the lamp 41a. The lamp gets brighter and decreases the resistance of photoresistor 41b. This decreases the amplitude of the sweep signal to the deflection power amplifier 28 which in turn decreases the amplitude of the drive current through the yoke 29.

Conversely, should line 62 be activated, the latch comprising gates 64 and 65 provides a high output to the integrator 67 causing integrator 67 to provide a negative slope ramp through the driver 68 and resistor 69 to lamp 41a. The lamp gets dimmer and increases the resistance of photoresistor 41b. This decreases the amplitude of the sweep signal to the deflection amplifier 28 which in turn increases the amplitude of the drive current through the yoke 29.

At such time as the amplitude of drive current through yoke 29 reaches the desired level, as established by the 14-bit reference number applied to the digital comparator 44, the 14 bits, $2^0-2^{13}$, will be of like value with the 14-bit reference number, and line 63 will be activated.

The time constant of integrator 67 is preferably in the order of 30 seconds. This is a sufficient time period to permit the brightness of lamp 41a to change slowly rather than rapidly. This keeps the sweep from changing noticeably between measurements on any two successive sweeps, therefore preventing overcorrection and subsequent overshoot.

In order to ensure that the displaying of seismic data does not take place during the period of time that the drive current through yoke 29 is being changed, there is provided the latch 70 of FIG. 5. A load sweep signal from the computer is applied through inverter 71 to the latch 70, comprising gates 72 and 73. This sets the latch output low to inhibit displaying. The output goes high to enable plotting only after the SW= signal appears at the input to the latch by way of inverter 74, this SW= signal being provided by the comparator 44 of FIG. 4 whenever the 14-bit number $2^0-2^{13}$ and the 14-bit reference number are identical.

Figure 4:
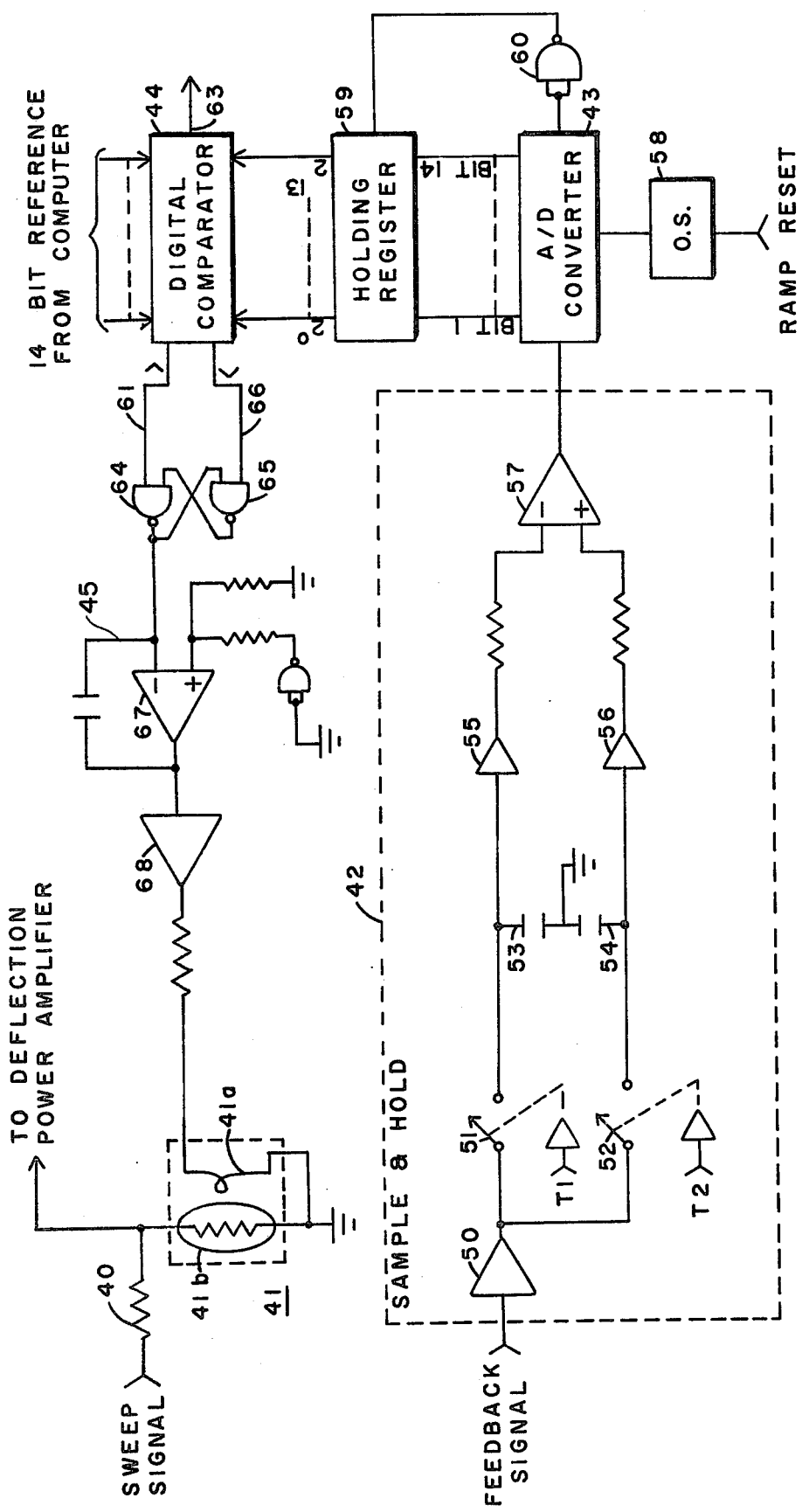

Various values and types of circuit components may be utilized for the circuits illustrated in FIGS. 4 and 5. In accordance with one specific circuit that has been successfully built and operated, the following TABLE sets forth specific types and values of circuit components.

TABLE

| Reference Designation | Description |
|---|---|
| Lamp 41 | 301R2-12 (Sigma) |
| Digital Comparator 44 | SN74174 (Texas Instruments) |
| Holding Register 59 | SN7485 (Texas Instruments) |
| A/D Converter 43 | ADC-149-14B (Datel) |
| Switches 51 and 52 | D6200BA (Siliconix) |
| Voltage Followers 50, 55, and 56 | LM110D (National) |
| Amplifiers 57 and 67 | LM108AD (National) |
| Lamp Driver 68 | LM0002 (National) |
| Multivibrator 58 | SN74121 (Texas Instruments) |
| All gates | SN7400 (Texas Instruments) |
| All inverters | SN7404 (Texas Instruments) |
| All capacitors | 0.1 microfarad |

The foregoing circuit types and values have been given as illustrative of one embodiment of the present invention and can be taken as a general guide toward design of one such embodiment though it is understood that in other modifications other circuit values and types could be used.

I claim:
1. A seismic data processing system comprising:
    (a) a cathode-ray tube,
    (b) a multiplexer for successively applying seismic data for each of a plurality of seismic channels to said cathode-ray tube to intensity modulate the electron beam one time during each sweep of the electron beam across the face of the cathode-ray tube for each of the seismic channels,
    (c) means for producing a sweep signal,
    (d) means for applying said sweep signal to the yoke of the cathode-ray tube to drive the electron beam across the face of the cathode-ray tube,
    (e) means for generating a digital reference number representative of the value of the drive current through the yoke required for the display of a predetermined number of seismic traces per unit length of sweep,
    (f) means for making a measurement representative of the amplitude of the drive current through said yoke by adding the sampled value of the drive current at two spaced-apart times between which seismic data is to be displayed on the face of the cathode-ray tube,
    (g) an analog-to-digital converter for digitizing said drive current measurement,
    (h) a digital comparator for comparing said digitized drive current measurement with said digital reference number, and

(i) means for automatically varying said sweep signal until said digitized drive current measurement and said digital reference number are the same.

2. The system of claim 1 wherein said means for applying said sweep signal to said yoke comprises a voltage divider including a fixed resistance and a variable resistance, that portion of said sweep signal across said variable resistance being applied to said yoke.

3. The system of claim 2 wherein said means for automatically varying said sweep signal comprises means for varying said variable resistance in said voltage divider in accordance with the differential between said digitized drive current measurement and said digital reference number.

4. The system of claim 3 wherein said variable resistance is a photoresistor and said means for varying said resistance comprises:
   (a) a lamp,
   (b) means for increasing the brightness of said lamp so as to decrease the resistance of said photoresistor when the magnitude of said digitized drive current measurement is greater than said digital reference number, and
   (c) means for decreasing the brightness of said lamp so as to increase the resistance of said photoresistor when the magnitude of said digitized drive current measurement is less than said digital reference number.

5. The system of claim 4 wherein said means for increasing and decreasing the brightness of said lamp includes:
   (a) a latch whose output is set low when the digitized drive current measurement is less than said digital reference number and is set high when the digitized yoke voltage is greater than said digital reference number,
   (b) an integrator coupled to the output of said latch, said integrator providing a positive slope ramp voltage when said latch is set low and a negative slope ramp voltage when said latch is set high, and
   (c) means for driving said lamp with the output of said integrator so as to decrease the lamp brightness in response to the positive slope ramp voltage from said integrator and for increasing the lamp brightness in response to the negative slope ramp voltage from said integrator.

6. The system of claim 1 further including means for inhibiting the display of seismic data on the cathode-ray tube until said digitized drive current measurement and said digital reference number are the same.

7. The system of claim 1 wherein said means for making a measurement representative of the amplitude of the drive current through said yoke comprises:
   (a) a resistor connected in series with said yoke and through which said drive current flows, and
   (b) means for measuring the peak-to-peak voltage across said resistor at said two spaced-apart times, said voltage being proportional to the peak-to-peak amplitude of the drive current through said yoke.

* * * * *

UNITED STATES PATENT AND TRADEMARK OFFICE
CERTIFICATE OF CORRECTION

PATENT NO. : 4,193,058
DATED : March 11, 1980
INVENTOR(S) : Clarence G. Smith

It is certified that error appears in the above-identified patent and that said Letters Patent are hereby corrected as shown below:

Column 1, line 37, "at fixed intervals" should read --at fixed time intervals--;
          line 38, "recordins" should read --recordings--;
          line 67, "amplifier" should read --amplitude--;

Column 2, line 24, "lamp brightness and proportionate" should read ---lamp brightness and a proportionate--.

Signed and Sealed this

Nineteenth Day of August 1980

[SEAL]

Attest:

SIDNEY A. DIAMOND

Attesting Officer     Commissioner of Patents and Trademarks